United States Patent [19]

Adachi et al.

[11] Patent Number: 5,784,062
[45] Date of Patent: Jul. 21, 1998

[54] IMAGE OUTPUT DEVICE AND PROCESSING METHOD CONVERTING AN IMAGE FORMATION COMMAND INTO RASTER FORMAT

[75] Inventors: Koji Adachi; Hiroshi Ishikawa; Kenji Ogi; Koushi Kawamoto; Yoshinori Wada, all of Nakai-machi, Japan

[73] Assignee: Fuji Xerox Co., Ltd., Tokyo, Japan

[21] Appl. No.: 545,155

[22] Filed: Oct. 19, 1995

[30] Foreign Application Priority Data

Apr. 7, 1995 [JP] Japan .................. 7-082430

[51] Int. Cl.$^6$ ...................... G06T 1/00
[52] U.S. Cl. ...................... 345/418
[58] Field of Search ........... 395/118, 130, 395/504, 114, 761, 763, 792; 345/200–203, 418, 430; 382/309

[56] References Cited

U.S. PATENT DOCUMENTS

| | | | |
|---|---|---|---|
| 4,891,768 | 1/1990 | Willems et al. | 345/520 |
| 5,003,496 | 3/1991 | Hunt, Jr. et al. | 345/430 |
| 5,146,547 | 9/1992 | Beck et al. | 395/116 |
| 5,212,770 | 5/1993 | Smith et al. | 395/335 |
| 5,218,431 | 6/1993 | Gleicher et al. | 345/152 X |
| 5,237,655 | 8/1993 | Statt et al. | 395/504 |
| 5,502,804 | 3/1996 | Butterfield et al. | 707/502 |
| 5,515,481 | 5/1996 | Pardo | 395/117 |
| 5,524,186 | 6/1996 | Campbell | 395/115 |
| 5,533,170 | 7/1996 | Teitzel et al. | 395/108 |
| 5,570,459 | 10/1996 | Kam | 395/110 |
| 5,615,314 | 3/1997 | Schoenzeit et al. | 395/114 |
| 5,625,711 | 4/1997 | Nicholson et al. | 382/224 |
| 5,638,498 | 6/1997 | Tyler et al. | 395/117 |

FOREIGN PATENT DOCUMENTS

| | | |
|---|---|---|
| 1-188374 | 7/1989 | Japan . |
| 4-128068 | 4/1992 | Japan . |
| 6-149224 | 5/1994 | Japan . |

*Primary Examiner*—Anton Fetting
*Attorney, Agent, or Firm*—Oliff & Berridge, PLC

[57] ABSTRACT

The invention provides an image output device for use with a host computer connected to a network including an input unit for getting an image formation command for an image edit processing transmitted from the host computer through the network and inputting the image formation command to inside of the device, a raster image data conversion unit for sequentially converting the image formation command input by the input unit to raster image data, an image data coding unit for coding the raster image data converted by the raster image data conversion unit, a storing unit for storing the image formation command and raster image data coded by the image data coding unit, a decoding unit for decoding the raster image data stored in the storing unit in accordance with the image formation command, and an output unit for outputting the raster image data decoded by the decoding unit.

11 Claims, 6 Drawing Sheets

IMAGE OUTPUT DEVICE AND PROCESSING METHOD CONVERTING AN IMAGE FORMATION COMMAND INTO RASTER FORMAT

BACKGROUND OF THE INVENTION

1. Field of the Invention

The present invention relates to an image output device and an image processing method converting an image formation command transmitted from a host computer through a network to raster image data for executing output processing.

2. Discussion of the Related Art

Conventionally, to print an image produced by a computer used in a wordprocessor or desktop publishing (hereinafter, referred to as a host computer), input and editing of data are carried out by an application software used in the host computer and then image formation commands are transmitted to an image output device such as a printer. Thus printing is carried out based on the image formation commands.

In particular, in the case the image output device is a page printer using the electrophotographic method, an image formation command described in a page description language composed of, for example, PostScript (a product name of Adobe Systems Inc.) or Interpress (a product name of Xerox Corporation) is converted to raster image data in the image output device, and then printing process is carried out based on the raster image data. The image formation commands such as GDI (Graphics Device Interface, a product name of Microsoft Corp.) or Quick Draw (a product name of Apple Computer, Inc.) can be used other than the page description language.

In such image output device, a printing system disclosed in Japanese Patent Application Unexamined Publication No. Hei. 1-188374 (1989) comprises a storing device for receiving an image formation command file (hereinafter, referred to as a job) for printing transmitted from the host computer and storing it, a processor for interpreting the image formation command and converting it to raster image data and a printing device carrying out the printing operation in accordance with the raster image data.

After transmission of the job from the host computer, the printing system interprets the image formation command for printing operation so as to decrease the load of the host computer, which results in increase of processing speed of the device as a whole.

However, under the distributed environment using a network, there are many cases where plural host computers share an image output device to use; accordingly, if many host computers concentratively request the printing operation at once, it takes a long time for some of the host computers from requesting the printing operation to execution of printing because the image output device sequentially interprets jobs for printing. In image formation or editing by the wordprocessor or desktop publishing, proofreading such as change of layout or fonts is frequently required, and therefore re-transmission of jobs after proofreading is necessary. In this case, though a little part is proofread, it takes a long time until the start of execution of printing because the image output device interprets the image formation commands of the whole jobs.

To resolve the problem, a page description language process printing device disclosed by Japanese Patent Application Unexamined Publication No. Hei. 4-128068 (1992) includes the tight coupling of plural processors by a bus and parallelly interprets the plural image formation commands by a program, thus performing high-speed processing. An image outputting method and a device thereof disclosed by Japanese Patent Application Unexamined Publication No. Hei. 6-149224 (1994) has no time to wait for the start of printing since raster image data conversion in a page memory corresponding to the resolution of the printer is carried out in parallel with input and edit operation by the application software.

However, in the page description language process printing device disclosed by Japanese Patent Application Unexamined Publication No. Hei. 4-128068 (1992) described above, the plural processors are mounted on a single device, and accordingly a complex mechanism for parallel processing is required, whereby the cost increases. Besides, though the time to wait for the start of printing is shortened by parallel processing by the plural processors, the printing device cannot be used efficiently because interpretation and execution of the image formation commands are carried out sequentially.

In the image outputting method and a device thereof disclosed by Japanese Patent Application Unexamined Publication No. Hei. 6-149224 (1994), interpretation of the image formation commands is performed in the host computer; therefore, it is not suited for the distributed environment in which the plural host computers are connected to the image output device through the network, and besides, there occurs another problem such that image formation and editing operations exceeding the page memory cannot be processed.

SUMMARY OF THE INVENTION

The present invention has been made in view of the above circumstances and has as an object of providing an image output device and an image processing method capable of reducing the time to wait for the start of printing after requesting it even in the distributed environment using a network.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims. To achieve the objects and in accordance with the purpose of the invention, as embodied and generally described herein, an image output device of the present invention for use with a host computer connected to a network comprises input means for getting an image formation command for an image edit processing transmitted from the host computer through the network and inputting the image formation command to inside of the device, raster image data conversion means for sequentially converting the image formation command input by the input means to raster image data, image data coding means for coding the raster image data converted by the raster image data conversion means, storing means for storing the image formation command and raster image data coded by the image data coding means, decoding means for decoding the raster image data stored in the storing means in accordance with the image formation command, and output means for outputting the raster image data decoded by the decoding means. An image processing method for an image output device of the present invention comprises the steps of receiving an image formation command transmitted through a network, sequentially converting the received image formation command to raster image data, coding the raster image data, storing the coded raster image data, and decoding the stored raster image data on receiving instruction of output processing transmitted through the network and outputting the data.

In the image output device of the present invention, the image formation commands for image editing process transmitted from the host computers through the network are sequentially converted to the raster image data by raster image data conversion means, coded by the image data coding means and stored in the storing means. For this reason, even if the image formation commands are transmitted from the plural host computers through the network, all raster image data can be stored with a small storing capacity, and as soon as the instruction of output is provided by any of the host computers, the corresponding raster image data can be decoded, and output of an image can be carried out.

Moreover, according to the image processing method of the present invention, the image formation commands are received in parallel with the input and edit processings by the application software carried out in the host computer and then sequentially converted into raster image data. The raster image data is coded and stored. On receiving instruction of output processing from the host computer, or on completing the input and edit processings by the application software, related raster image data is decoded and output. Therefore, the output processing after storing and decoding of the raster image data corresponding to each host computer can be immediately executed even in the distributed environment in which the plural host computers are connected to the image output device though the network.

Furthermore, according to the present invention, in the host computer, a data division component divides the edit commands and image data into units transmitted to the image output device in accordance with the communication protocol program and every unit is transmitted to the network, and the image output device prepares a command line in a rasterizing unit from the image formation commands and image data of divided units obtained through the network and then sequentially executes rasterizing process of the command line in the rasterizing unit. Consequently, the image output device can be operated per every command line unit, whereby time to wait for the start of printing can be shortened in comparison with the case where the rasterizing process is carried out in one lot of the page.

BRIEF DESCRIPTION OF THE DRAWINGS

The accompanying drawings, which are incorporated in and constitute a part of this specification illustrate embodiment of the invention and, together with the description, serve to explain the objects, advantages and principles of the invention. In the drawings.

DETAILED DESCRIPTION OF THE PREFERRED Embodiment

A preferred embodiment of an image output device and an image processing method according to the present invention is now described in detail based on the drawings.

Embodiment

Figure 1:
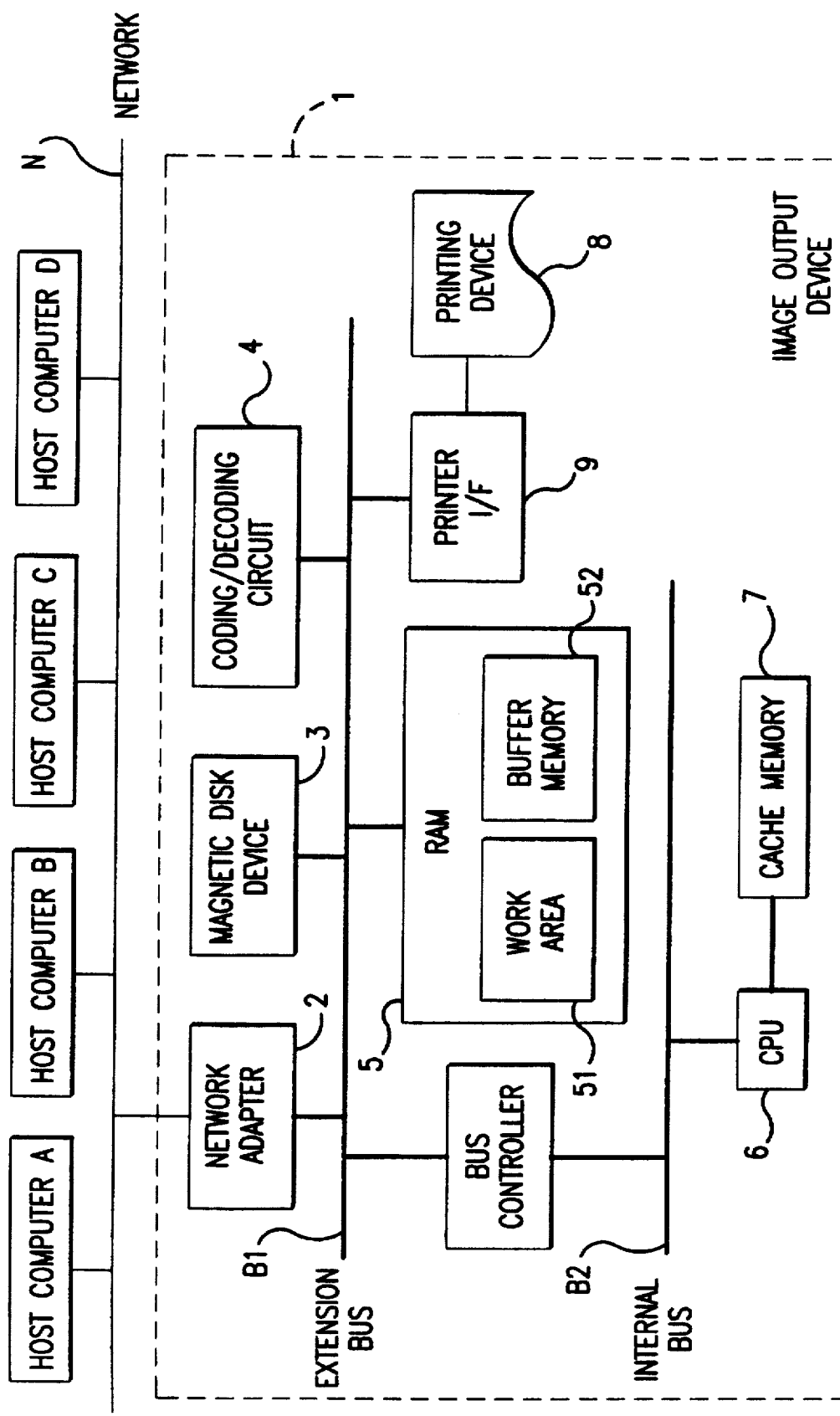
FIG. 1 is a block diagram showing an embodiment of an image output device according to the present invention.

FIG. 1 is a block diagram showing an embodiment of an image output device according to the present invention. An image output device 1 is shared to be used by plural host computers (for example, A through D in the figure) connected through a network N, which is, for example, constituted by workstations except for a printing device 8.

The image output device 1 comprises a network adapter 2 inputting data from the host computers A through D and outputting data to the host computers A through D, a magnetic disk device 3 storing an operating system (OS), application program, font data and various data files etc., a coding/decoding circuit 4 coding and decoding the image data, a RAM 5 used as a work area 51 in executing the application program and a buffer memory 52 for the image data converted to the raster image data, a CPU 6 executing application programs such as receiving or interpreting processes of the image formation commands and raster image data conversion, a cache memory 7 storing data or program necessary for execution of the CPU 6 on each occasion, and printer I/F 9 transmitting the raster image data stored in the buffer memory 52 to the printing device 8. An extension bus Ba1 connecting the network adaptor 2, magnetic disk device 3, coding/decoding circuit 4, RAM 5 and printer I/F 9, an internal bus Ba2 to which the CPU 6 is connected, and a bus controller 10 connecting the extension bus Ba1 and the internal bus Ba2 are also disposed in the image output device 1.

The host computer comprises an internal memory storing image data consisting of documents and images to be edited, an input device for inputting instruction from an operator, and a processor component for executing an edit process on the data stored in the internal memory to convert it into data which is processible for an image output device, described later, in accordance with instruction of inputting from the input device. The operator can provide instructions about editing such as designation of the character font used in the documents, composition of documents and images or the like on the data to be edited. The processor component comprises an image formation command preparation component preparing the image formation command in accordance with the input instruction transmitted from the input device, a data division component dividing the image formation command and image data into the unit to be transmitted to the image output device, and a transmission component transmitting the divided data prepared in the data division component to the image output device per every divided data unit. As the divided unit, for example, it is preferable that the edit command is divided into command unit and the image data is divided into object unit.

The printing device 8 in this embodiment is, for example, a color printer using the electrophotographic method with 400 dpi resolution, CMYK multi-color (8 bits for each color) and the A3 largest size of the recording sheet, and as the buffer memory 52 of the RAM 5, 128 MB corresponding to one page of A3 recording sheet is provided. The characteristic of the image output device 1 of this embodiment lies in sequential conversion of the image formation command transmitted from the input device into the raster image data by program processing in the CPU 6, coding the data by the coding/decoding circuit 4 and storing it in the magnetic disk device 3, and decoding it to be output by the printing device 8.

In the image output device 1, with the network adapter 2, a command line preparation component receives a command sequence consisting of the edit command and edit data transmitted from the host computer, a command line preparation component prepares the command line, a unit for executing rasterizing process utilizing the command sequence, and a command file preparation component prepares a command file based on the plural command lines. As described later, the command line goes through the operations such as coding/decoding or the like in the state of this unit. It is preferable to divide the command lines in accordance with the attribute of the image data to be edited. For example, in character printing, it is desirable that the command line is divided into each character unit and in composition of photographs, it is desirable to divide the command line into each photograph unit.

Figure 2:
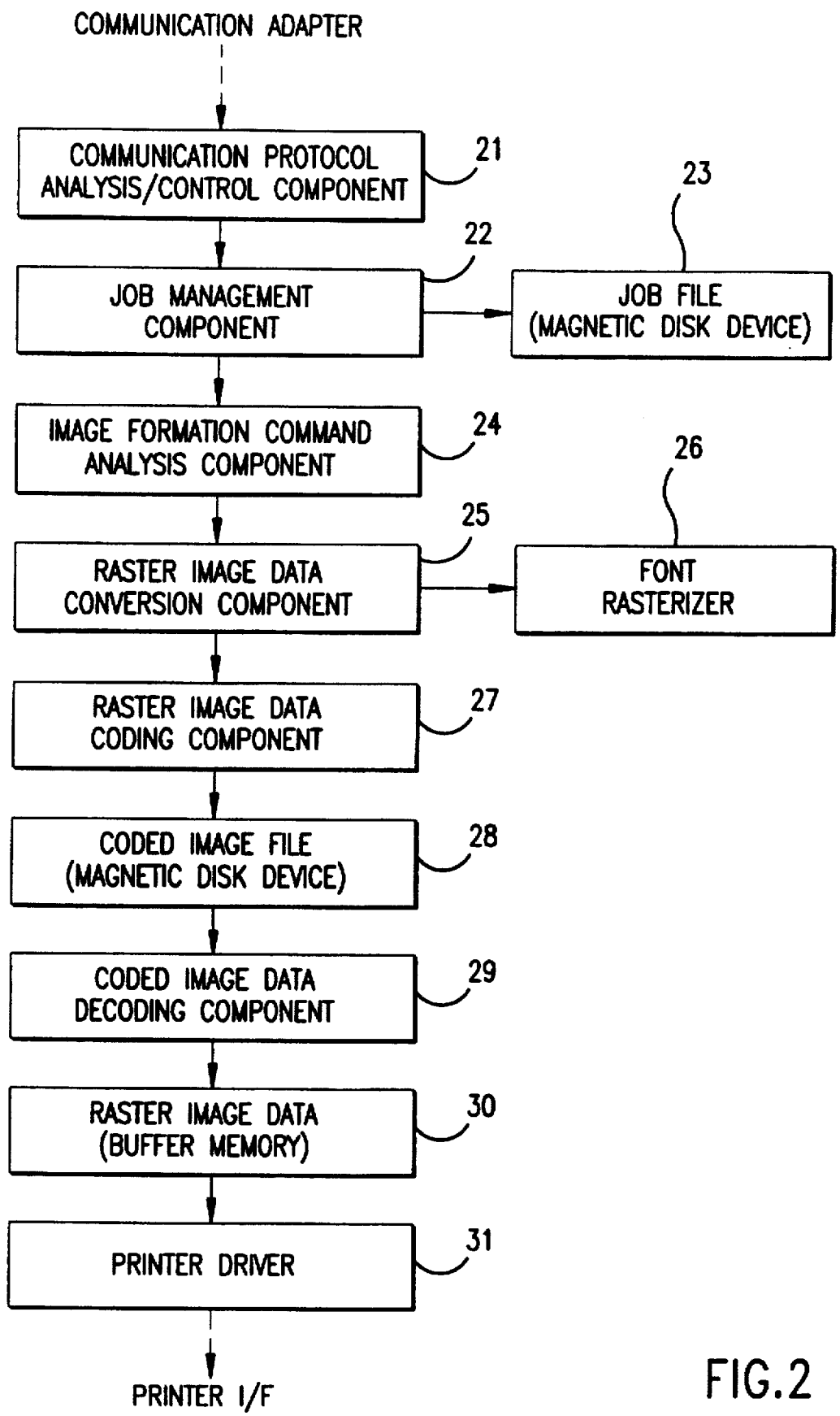
FIG. 2 is a block diagram showing functions of the image output device according to the present invention.

Next, the operations of the image output device 1 are described in detail based on FIG. 2, which is a block diagram showing the functions of the image output device and in particular mainly showing the flow of program processings in the CPU 6 (see FIG. 1) with the construction of processings in due order. In the following description, reference numbers not shown in FIG. 2 are those shown in FIG. 1.

In a communication protocol analysis/control component 21, protocols of information which are input and output between the host computer and the image output device through the network adapter 2 are analyzed. The communication protocol analysis/control component 21 is set to be able to support a plurality of general protocols for dealing with the plural host computers.

Figure 3:
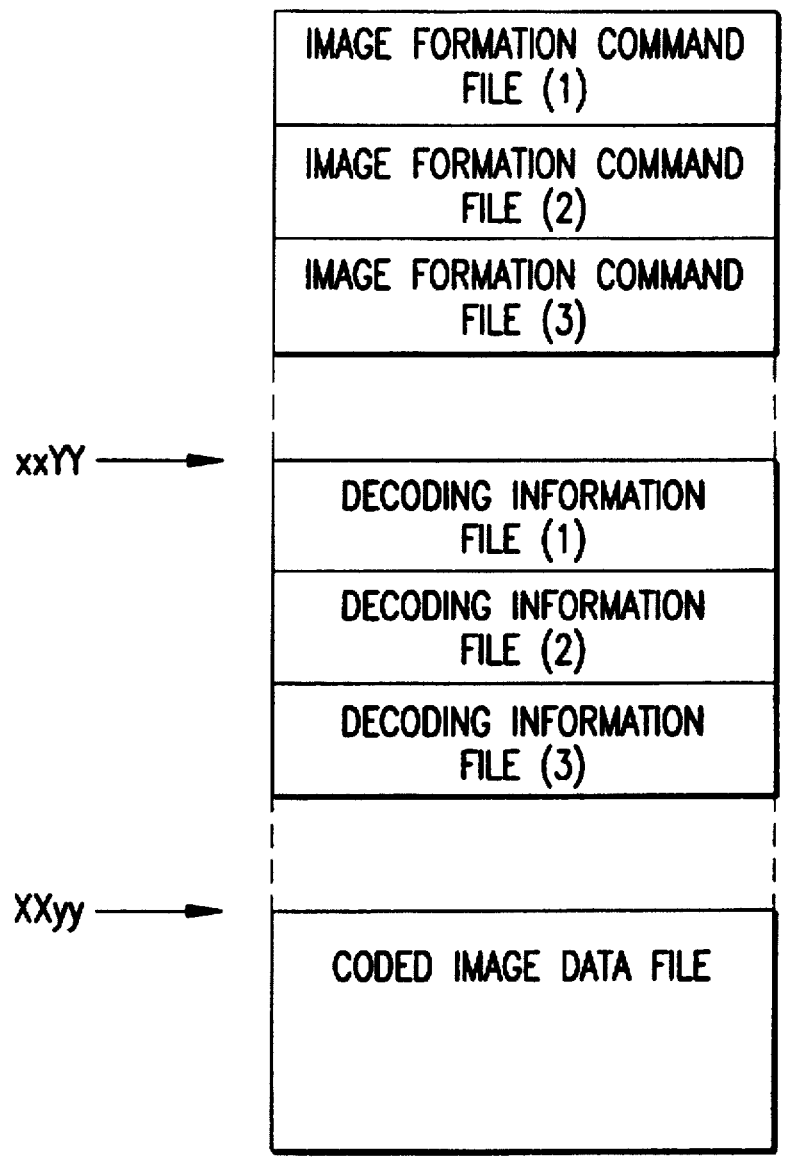
FIG. 3 shows a concept of file management.

A job management component 22 manages an image formation command file sequentially storing image data prepared by the application software of the host computer or the image formation command for image edit processing and a decoding information file which provides instructions in decoding the coded raster image prepared based on the image formation command. These files are stored in the magnetic disk device as a job file 23. FIG. 3 shows a concept of file management in the job management component 22. In a memory area of the magnetic disk device 3, continuous areas are obtained for the image formation command files (1)–(3) storing the image formation commands and the decoding information files (1)–(3) corresponding thereto, but the continuous area is not always needed to be stored in storing these files.

In the memory area of the magnetic disk device 3, an area for a coded image data file, which will be described later, is also obtained and the storing position is managed in the decoding information per every image formation command of the corresponding decoding information file. The coded image data file may be randomly stored.

Figure 4:
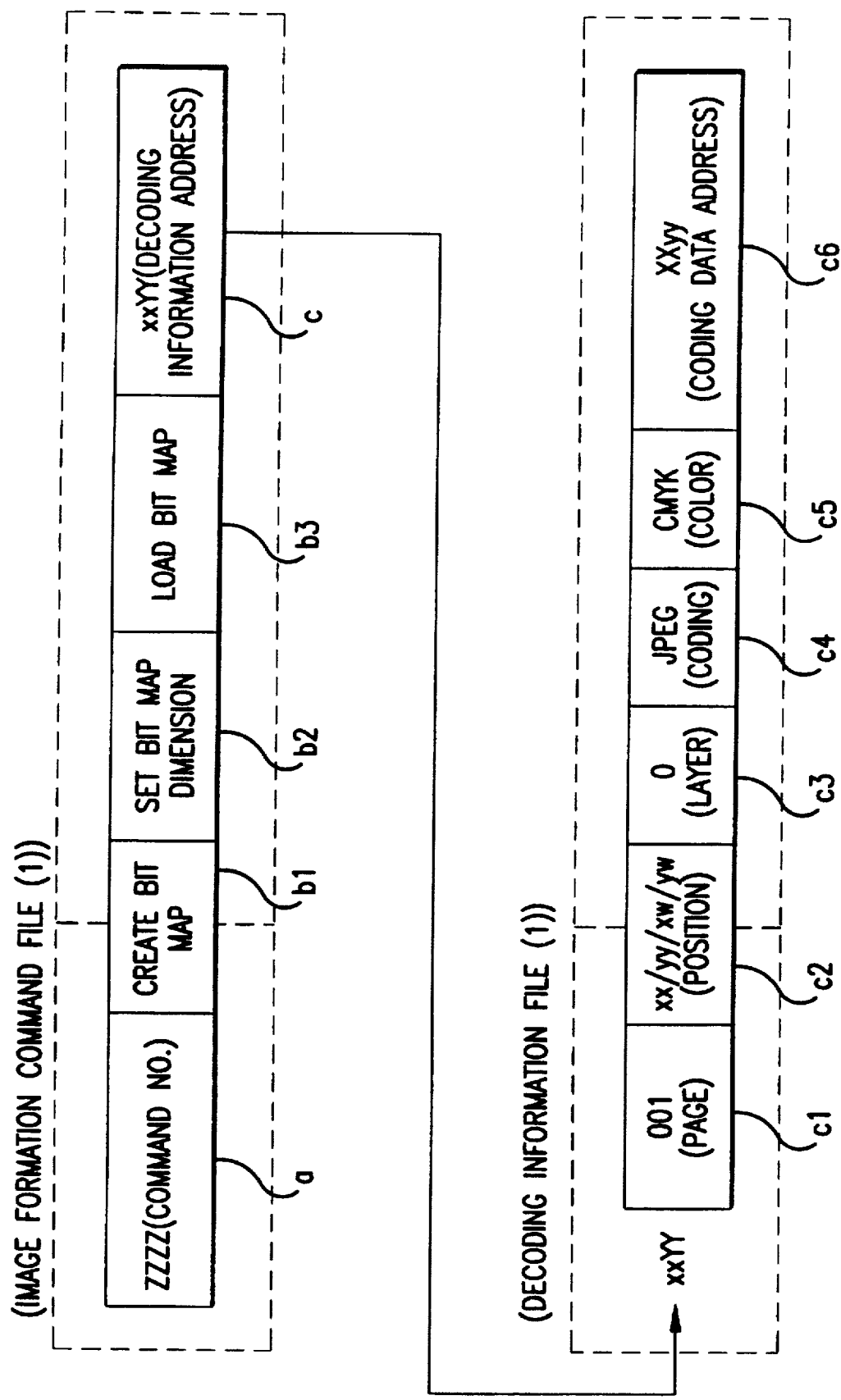
FIG. 4 shows a construction of a file.

The file construction of the image formation command file or the decoding information file is shown in FIG. 4. That is, the image formation command file (for example, the image formation command file (1) shown in FIG. 3) consists of a command No. (see column a in FIG. 4), a command group for forming an objects (see columns b1 through b3) and a decoding information address showing the storing position of the decoding information file (see column c). Here, objects refer to graphics or scanned image such as characters, lines or rectangular areas.

In the example of the image formation command shown in FIG. 4, as the command No. (zzzz) in column a, the image formation command indicating that the scanned image is taken in a document by an application program is suggested. That is, if the image formation command composed of GDI is used, the command in the column b1 "CreateBitMap" indicates preparation of bitmap, the command in the column b2 "SetBitMapDimension" indicates setting of height and width of the bitmap and the command in the column b3 "LoadBitMap" indicates the load of the bitmap from a resource file. As the decoding information address shown in the column c, "xxYY" is stored.

The decoding information address "xxYY" corresponds to, for example, the address showing the storing position of the file shown in FIG. 3. In the decoding information file (1) indicated by the decoding information address "xxYY", as shown in FIG. 4, a page in decoding is stored in the column c1, decoding position in the page is stored in the column c2, a layer is stored in the column c3, the coding method is stored in the column c4, the color is stored in the column c5 and the coded data address showing the storing position of the coded raster image data is stored in the column c6.

The decoding position in the page stored in the column c2 consists of an origin of the raster image data (xx/yy), the width of the lateral direction (xw) and the width of the longitudinal direction (yw), each of which represents a rectangular area. In decoding the raster image data for one page, superimposing parts of each of the coded image data are overwritten in order; therefore, the layer in the column c3 is referred to in the case where a certain image formation command overlays. The color in the column c5 shows the color of the corresponding coded image data. The area for the decoding information file is obtained before converting the image formation command into the raster image data, and the decoding information file is generated after coding of the raster image data and then stored in the area obtained in advance.

The job management component 22 shown in FIG. 2 manages the image formation command file and the decoding information file used in decoding the coded raster image as described above. An image formation command analysis component 24 divides the image formation command in the image formation command file per every object and maintains image formation condition instructed outside of a group of the image formation commands divided per every object to provide conversion conditions to the subsequent raster image data conversion component 25.

In the raster image data conversion component 25, the group of the image formation commands transmitted from the image formation command analysis component 24 is received and converted into the raster image data per every object in conformance with the resolution of the printing device 8 (in this embodiment, 400 dpi) and the color reproduction property. With respect to the color reproduction, the printing device 8 of this embodiment uses CMYK (Cyan, Magenta, Yellow and Black) color signals conforming to the color of toner, but the display of the host computer adopts RGB (Red, Green and Blue) color signals. Therefore color conversion from RGB to CMYK is carried out.

If the image formation command includes fonts, font data is obtained from a font rasterizer 26. The font rasterizer 26 converts the character object into the raster image data utilizing outline font data stored in the magnetic disk device 3 in accordance with the instruction of the raster image data conversion component 25.

In the raster image data coding component 27, the raster image data converted in the raster image data conversion component 25 is coded. The coded image file 28 is transmitted to the magnetic disk device 3 and at the same time the decoding information data generated in coding is transmitted to the job management component 22. As previously described, only the area for the decoding information file is obtained before the image formation command is converted into the raster image data, and the decoding information data, which is the content of decoding information file, is transmitted to the job management component 22 when coding is carried out, and then written in the decoding information file where the area for storing is obtained in advance.

Here, the coding method of the raster image data in the present embodiment is explained. In this embodiment, the runlength coding method is applied to the character data and the graphics data, and a compressing/coding method for the natural color image called Joint Photographic Coding Experts Group (JPEG) prescribed by International Standardization Organization (ISO) is applied to the scanned image such as photographic data. The former is processed with software and the latter is processed by the coding/decoding circuit 4.

Figure 5:
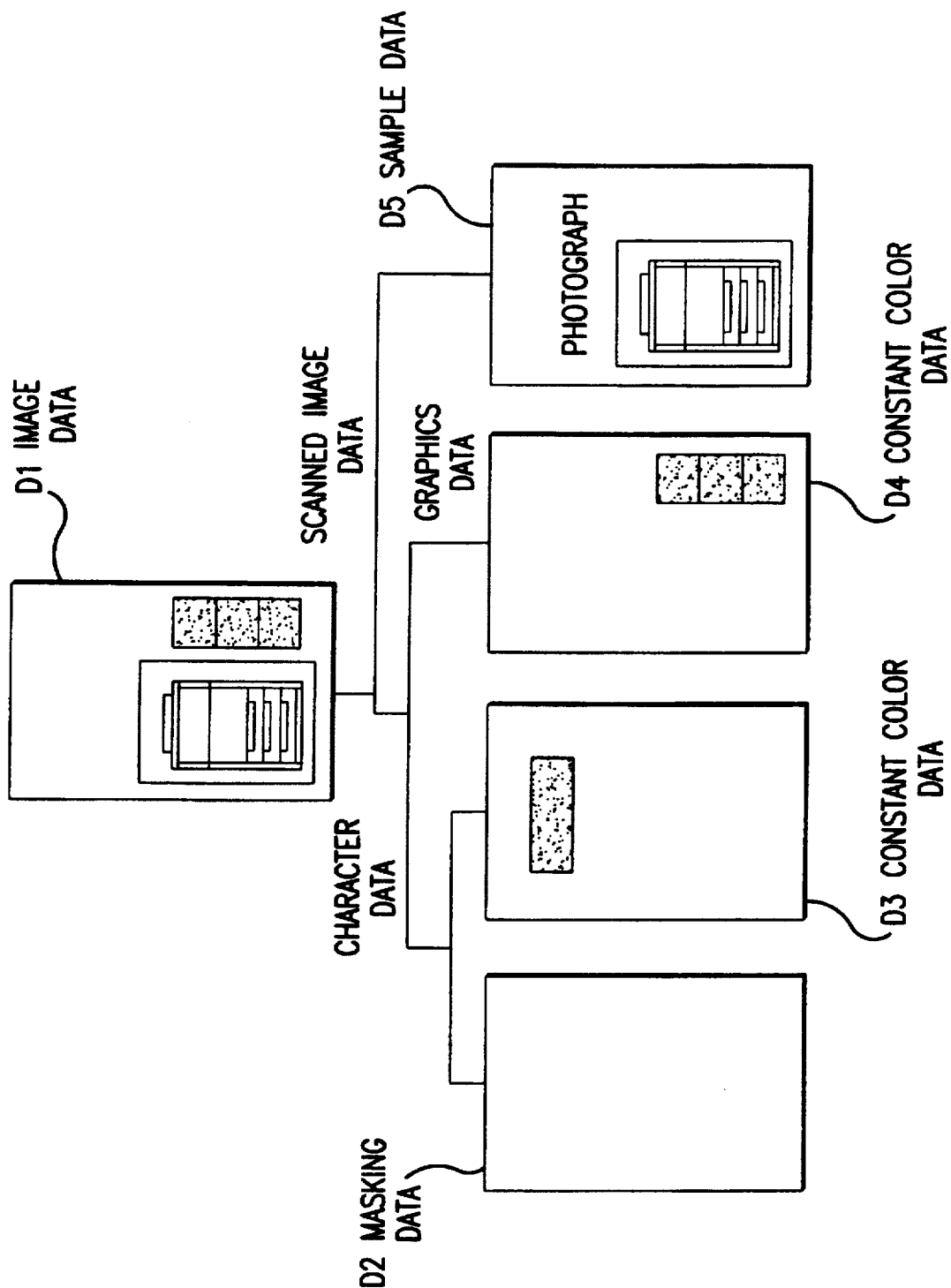
FIG. 5 shows a concept of coding process.

FIG. 5 shows a concept of the coding process. Image data D1 described with the image formation command is composed of the character data consisting of the font data, the graphics data prepared by the figure/graph preparation software or the like, and the scanned image data made by reading photographs etc. by a scanner, for example. The character data is composed of masking data D2 which is binary data and constant color data D3 which performs coloring of the character data. With respect to the masking data D2, the 8-bit/4-color raster image data can be compressed to 1/32.

With respect to the constant color data D3, there are many cases where data having the same value succeed for some hundreds or thousands of pixels in the main scanning direction; accordingly, a high compression rate can be obtained by employing the runlength coding method. In the sub scanning direction, also, similar pixels often succeed, and therefore higher compressing rate can be obtained.

The graphics data is composed only of constant color data D4, and therefore a high compression rate can be obtained by adopting the runlength coding method as same as the case of the constant color data D3. For this reason, a high compression rate of 1/10 to 1/30 can be obtained for a document containing a small amount of scanned image data. The scanned image data consists of sample data D5 and coding by the JPEG is applied thereto. A method used in this coding process is a variable length coding method called as the discrete cosine transformation (DCT) method, which is described in, for example, "The Journal of the Institute of Image Electronics Engineers of Japan" vol. 18, No. 6, pp. 398–407. Thereby a high compression rate of 1/10 to 1/20 can be provided for the scanned image data.

Figure 6A:
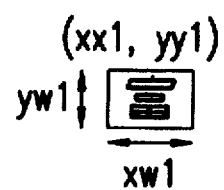
FIGS. 6(a) and 6(b) are views showing positional data, 6(a) is the case of character data and 6(b) is the case of graphics data.
Figure 6B:
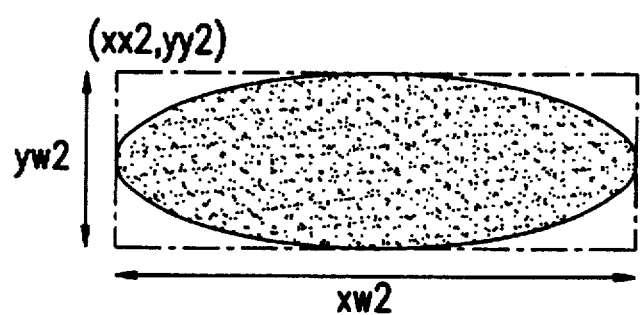

In this way the raster image data is coded in the raster image data coding component 27, and then the decoding information file which has been previously described is generated. As a decoding position, the origin of the decoded raster image data (xx/yy), the width of the lateral direction (xw), and the width of the longitudinal direction (yw) are stored in the decoding information file. If the raster image consists of the character image as shown in FIG. 6(a), the left top is simply the origin (xx1, yy1) and the rectangular area in which a character exists is the positional data (width: xw1, height: yw1). In the case of the graphics data containing an ellipse, for example, as shown in FIG. 6(b), since the above-described runlength coding method cannot be applied to the graphics data of the present state, the left top of the circumscribing rectangular area of the graphics data is assumed to be the origin (xx2, yy2) and the circumscribing rectangular area (width: xw2, height: yw2) is regarded as the positional data on condition that a tag such that the outside of the graphics data is invalid in coding is provided.

At the stage of completing image formation and image edit process in the host computer carried out by a user and provision of instruction of printing, a coded image data decoding component 29 in FIG. 2 selects a corresponding decoding information file to decode the coded image data in the coded image file 28 per every page in order, and the decoded raster image data 30 is input to the buffer memory 52. The printer I/F 9 outputs a page synchronizing signal to the printing device 8 in accordance with the input of the raster image data to the buffer memory 52, and the raster image data in the buffer memory 52 is transmitted to the printing device 8 per every one pixel in accordance with a control signal (a line synchronizing signal, a video clock signal or the like) output from the printing device 8. At this time, the printer I/F 9 is operated by the printer driver 31, whereby printing output designated by the user is executed.

Next, the image processing method based on the operations of the image output device 1 will be described. The image output device 1 is assumed to be shared by the plural host computers (host computers A through D, for example) in the distributed environment using the network N.

A user of each host computer first communicates with the image output device 1 connected to the network N when he/she is going to carry out image formation and image edit process to request the job management component 22 shown in FIG. 2 to set a predetermined application program. The application program sequentially transmits the image formation commands prepared in executing image formation and editing by the host computer to the image output device 1.

After completing the above-described setting, the user of the host computer carries out the image formation and image edit processing. When a predetermined image formation command is prepared, it is sequentially transmitted to the image output device 1 through the network N. That is, in the case where the user carries out the image formation and image editing utilizing the predetermined application software in the host computer, image formation commands corresponding to predetermined objects are sequentially transmitted from the host computer to the image output device 1 in parallel with the input/edit processing by the application software.

After the image formation commands are transmitted to the job management component 22 through the network adapter 2 of the image output device 1, the job management component 22 temporarily stores the image formation commands and then transmits them to the image formation command analysis component 24. The image formation command analysis component 24 divides the image formation command per each object and transmits division information to the job management component 22. The job management component 22 transmits the groups of the image formation commands divided per each object to the image formation command file of the magnetic disk device 3 in order so that the groups of the image formation commands are stored.

Next, the groups of the image formation commands divided per each object in the image formation command analysis component 24 are transmitted to the raster image data conversion component 25 to be converted into the raster image data and then coded in the raster image coding component 27. The coded raster image data is stored in the coded image file 28 of the magnetic disk device 3 in order. That is, even in the case where many image formation commands are concentratively transmitted from the plural host computers, the image output device 1 sequentially converts the image formation commands to the raster image data and codes them to be stored in the magnetic disk device 3. Therefore, even in the distributed environment where many host computers are connected through the network N, a large amount of raster image data can be stored.

At the same time when the coded raster image data is stored, the decoding information data corresponding to the groups of the image formation commands divided per each object is prepared. If the image formation and image edit processings in the host computer carried out by the user are completed and the instruction of printing is provided, the coded image data decoding component 29 refers to the decoding information file corresponding to the instruction, draws out the coded image data per each object from the coded image file 28, and decodes and stores the raster image data 30 in the buffer memory 52. The stored raster image data 30 is transmitted to the printing device 8 through the printer I/F 9 by the printer driver 31, thus printing the desired image data.

As shown in FIG. 4, the image formation command is stored per each object in the image formation command file (1) and the coded data address is stored in the decoding information file (1). Accordingly, in the case where the proofreading is carried out after printing, only the groups of the image formation commands corresponding to the object to be proofread may be changed and converted into the raster image data. That is, there is no need to convert again the whole job into the raster image data, and consequently printing after proofreading can be immediately executed.

As described above, according to the image output device and image processing method of the present invention, even in the distributed environment utilizing the network where the image output device is shared to be used, since the image formation commands are transmitted to the image output device in parallel with the image edit processing in the host computers and are converted in to the raster image data and coded to be stored, the raster image data can be decoded and output immediately when the instruction of output of the image is provided by the host computers; therefore the time to wait for the output can be greatly reduced.

Moreover, because the raster image data converted in the image output device is coded and stored, the raster image data transmitted from a lot of host computers can be stored even though the storing capacity is small, thus sufficiently serving the use of the image output device in the distributed environment. Thereby it is possible to provide the image output device and the image processing method having simple construction capable of reducing the time to wait for the output of the image after requesting thereof without requiring a large amount of storing capacity.

The foregoing description of preferred embodiment of this invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image output device for use with a host computer connected to a network, comprising:

input means for getting an image formation command for an image edit processing transmitted from said host computer through said network and inputting said image formation command into said device;

raster image data conversion means for sequentially converting said image formation command input by said input means to raster image data;

image data coding means for coding said raster image data converted by said raster image data conversion means;

storing means for storing said image formation command and said raster image data coded by said image data coding means;

decoding means for decoding said raster image data stored in said storing means in accordance with said image formation command; and output means for outputting said raster image data coded by said decoding means, wherein said image formation command is stored in said storing means with storing component address information indicating a position for storing decoding information used in decoding said coded raster image data.

2. The image output device according to claim 1, wherein said storing means stores decoding information used in decoding said raster image data with said image formation command and said coded raster image data, and said decoding means decodes said coded raster image data in accordance with said decoding information.

3. The image output device according to claim 2, wherein said decoding information includes page information indicating a page in decoding said coded raster image data, positional information indicating a decoding position in said page, coding information indicating a coding method and coding data address information indicating storing position of said coded raster image data.

4. The image output device according to claim 1, wherein said decoding information includes page information indicating a page in decoding said coded raster image data, positional information indicating a decoding position in said page, coding information indicating a coding method and coding data address information indicating storing position of said coded raster image data.

5. The image output device according to claim 1, wherein said coding means compresses said raster image data.

6. An image processing method for an image output device, comprising the steps of:

receiving an image formation command transmitted through a network;

sequentially converting said received image formation command to raster image data;

coding said raster image data;

storing said coded raster image data; and decoding said stored raster image data on receiving instruction of output processing transmitted through said network and outputting said data, wherein said image formation command is stored with decoding information used in decoding corresponding raster image data which has been coded.

7. An image processing method for an image output device shared by plural host computers under distributed environment using a network in an image processing system where image formation commands for image editing process are transmitted from said plural host computers to said image output device, comprising the steps of:

sequentially carrying out raster image data conversion of each of said image formation commands, coding of said converted raster image data and storing said coded raster image data in parallel with inputting and editing process of application softwares executed in said plural host computers; and on completion of inputting and editing process of any of said application softwares executed in said plural host computers, decoding said raster image data related to said application software and outputting said decoded raster image data, wherein said image formation command is stored with decoding information used in decoding corresponding raster image data which has been coded.

8. The image processing method according to claim 7, wherein said decoding information includes page information indicating a page in decoding corresponding raster image data which has been coded, positional information indicating a decoding position in said page, coding information indicating a coding method and coding data address information indicating a storing position of said coded raster image data.

9. An image output device for use with a host computer connected to a network, said host computer comprising:

an input device for imputting an editing instruction of an operator;

an internal memory for storing image data to be edited and a processor component converting said image data stored in said internal memory into data processible by said image output device in accordance with said input instruction of said input device;

said processor component including an image formation command preparation component preparing said image formation command in accordance with said input instruction of said input device, a data division component dividing said image formation command and said image data into predetermined units to be transmitted to said image output device and a transmission component transmitting every unit of said divided data prepared by said data division component to said image output device;

said output device comprising:

command sequence preparation means for receiving an editing command and editing data from said host computer through said network and preparing a command sequence;

a command line preparation component for preparing a command line as a rasterizing process unit from said command sequence; and processing means for carrying out an image formation process of a raster image data per every command line.

10. The image output device according to claim 9, wherein said data division component divides said image data into same attribute unit on condition that said image data is character.

11. The image output device according to claim 9, wherein said data division component divides said image data into object unit.

* * * * *